United States Patent [19]

Zumstein

[11] Patent Number: 5,511,671
[45] Date of Patent: Apr. 30, 1996

[54] INSTALLATION FOR THE SORTING OF PLATE MATERIAL

[75] Inventor: Ernst Zumstein, Burgdorf, Switzerland

[73] Assignee: Bystronic Maschinen AG, Buetzberg, Switzerland

[21] Appl. No.: 226,981

[22] Filed: Apr. 13, 1994

[30] Foreign Application Priority Data

Apr. 14, 1993 [EP]  European Pat. Off. .............. 93810263

[51] Int. Cl.$^6$ .................................................. B07C 5/02
[52] U.S. Cl. .................... 209/542; 209/552; 209/659; 198/409; 198/370.11
[58] Field of Search ..................... 198/370, 372, 198/409, 468.9; 209/659, 540, 542, 552

[56] References Cited

U.S. PATENT DOCUMENTS 4,986,726  1/1991  Benuzzi et al. ................. 198/372 X

FOREIGN PATENT DOCUMENTS 0048334  3/1982  European Pat. Off. .

Primary Examiner—David H. Bollinger
Attorney, Agent, or Firm—Marks & Murase

[57] ABSTRACT

Plates, especially glass sheets, are fed for sorting to a putting-up machine wherein a glass sheet is set upright against a wall in front of which the glass sheet is held in a determined position by an air flow provided by a blower. One glass sheet at a time is withdrawn from this position and pulled into a sorting carriage by nippers. The sorting carriage is then displaced in front of a compartment carriage and the glass sheets contained in the sorting carriage are pushed out by the nippers and inserted into the corresponding compartment of a compartment carriage. The installation has a simple construction, works particularly efficiently and takes optimally care of the glass sheets.

21 Claims, 6 Drawing Sheets

1

INSTALLATION FOR THE SORTING OF PLATE MATERIAL

The present invention refers to an installation for the sorting or classifying of plate material, especially of glass plates. In particular, the present invention concerns such an installation useful in the preparation and the supply of sorted glass plates to a processing installation or plant, comprising at least one compartment carriage for containing and transporting said plates, and furthermore a sorting carriage for the controlled supply of certain plates and their transfer into certain compartments of the compartment carriage.

BACKGROUND OF THE INVENTION

A similar installation has for example become known from EP-A-0 048 334. Such installations are for example used for the centrally controlled manufacture of plates, especially of groups of certain glass plates. Such glass plate groups correspond to a certain order for a particular glassing work, and it is necessary to program and to centrally control the entire installation including the mentioned processing installation in such a manner that a great plurality of glass sheets or panes are supplied and processed in the correct sequence. This is particularly the task of the sorting installation whose sorting carriages contain the raw glass plates and transfer them into predetermined compartments of one or more compartment carriages.

The known installation mentioned above comprises a stationary conveyor installation for inserting prepared glass plates into the sorting carriage, and a movable conveyor device is connected to the sorting carriage for transferring glass plates into compartment carriages. This execution is expensive and does not permit an optimal and careful transport of the glass plates. Furthermore, the two conveyor devices which are both situated outside of the compartments of the sorting carriage which receives the glass plates, require considerable space.

SUMMARY OF THE INVENTION

The first object of the present invention is to simplify the known installation and to achieve an optimal conveyance and handling of the plates, for example glass plates. This first object is met in that the sorting carriage comprises at least one conveyor device which is suited for the inserting of plates into the sorting carriage and for the transfer of plates from the sorting carriage into the compartment carriage as well. The conveyor device preferably comprises movable nippers for seizing an edge of a plate. These nippers are located within the loading space of the sorting carriage, the conveyor device thus needing no additional space. As it will be explained below, this feature of the invention allows also an optimal and careful handling of the plates, especially glass plates.

Another solution of separate and independent importance is defined in claim 5. As it will still be explained below, a putting-up device according to FIG. 5 may be used at different locations in the installation in order to maintain plates, especially glass plates, in an about vertical position without mutual contact. This contactless holding of the plates presents not only the advantage of avoiding damages, for example of the fine coating of glass plates, but allows also the easy seizing and further transporting of the plates by suitable transportation means, in particular the nippers mentioned above.

Other preferred embodiments are described in the dependent claims.

The invention will now be explained in more detail with an embodiment thereof represented in the drawings and regarding the sorting of glass plates.

DETAILED DESCRIPTION OF THE INVENTION

Figure 1:
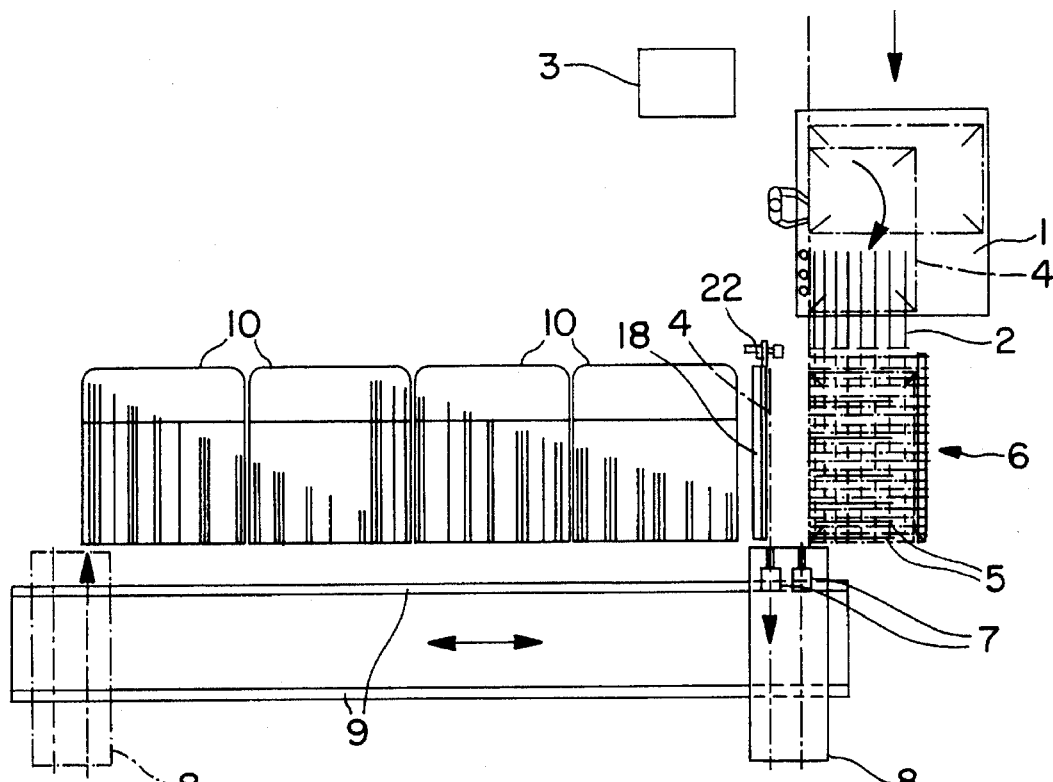
FIG. 1 shows a schematical overview of the sorting device of the installation.

The part of the installation schematically represented in FIG. 1 serves for preparing and sorting of the individual glass sheets. Glass plates which have been cut according to a predetermined plan are broken on a lifting air cushion table 1, and, if necessary, rotated in the manner indicated in FIG. 1, the plates leaving the table 1 in lengthwise direction, supported by a belt conveyor 2. Waste is deposited in a container 3. Regarding the cutting plan, reference is made to the above cited patent which is incorporated in the present document by reference. It is preferred to install a monitor at the table 1 opposite the operator showing the cutting plan and the necessary data concerning the sequence of the glass sheets to be transported off.

The belt conveyor 2 transports the individual, prepared glass sheets, for example the glass sheet 4 indicated in FIG. 1, on the pivotable supporting grid 5 of a putting-up machine 6. This putting-up machine will be described in all details below with FIGS. 2 and 3.

The putting-up machine 6 brings the glass sheets, supplied in horizontal position, in vertical position and transfers them afterwards by nippers 7 into a sorting carriage 8. This sorting carriage 8 comprises two pairs of nippers 7 and, correspondingly, two compartments for containing one glass sheet 4 in every compartment, the sorting carriage 8 being displaced each time into the position where one of its nippers can catch and take in a glass sheet 4. The sorting carriage may be displaced, as indicated in FIG. 1, lengthwise in a guide 9 in order to transfer individual glass sheets into compartment carriages 10. The installation shown contains four compartment carriages 10 which can be installed in an exactly determined position along the guide path 9. Each compartment carriage contains for example 100 compartments for receiving 100 glass sheets so that until 400 glass sheets can be sorted and, according to a pre-established program, distributed into the individual compartments of the compartment carriages. It is indicated in FIG. 1 that the compartments of the compartment carriages 10 are only partially occupied by glass sheets. As it will be described later in more detail, the compartment carriages 10 are generally not entirely loaded with glass sheets in the sorting station according to FIG. 1, but some compartments of these carriages will remain in general unoccupied and will later on be completed by special glasses supplied manually or mechanically.

Figure 4:
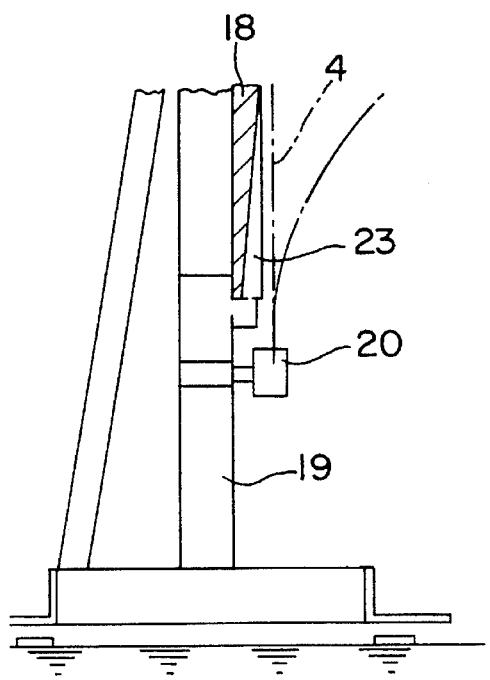
FIGS. 2 to 4 show a putting-up device which is part of the sorting device, FIGS. 5 and 6 schematically show the sorting carriage.
Figure 2:
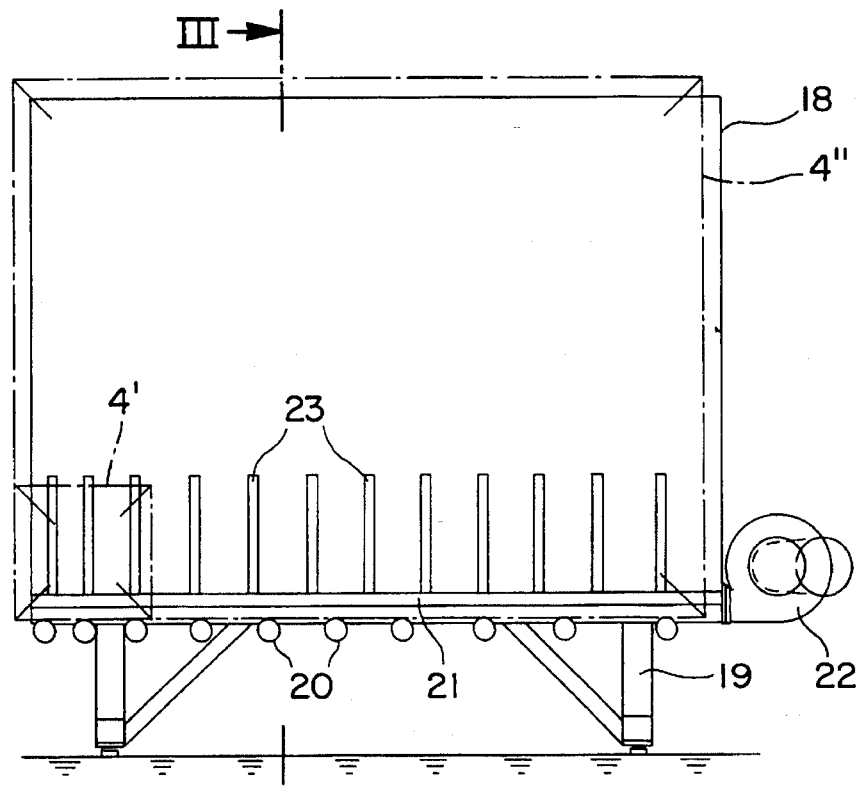
Figure 3:
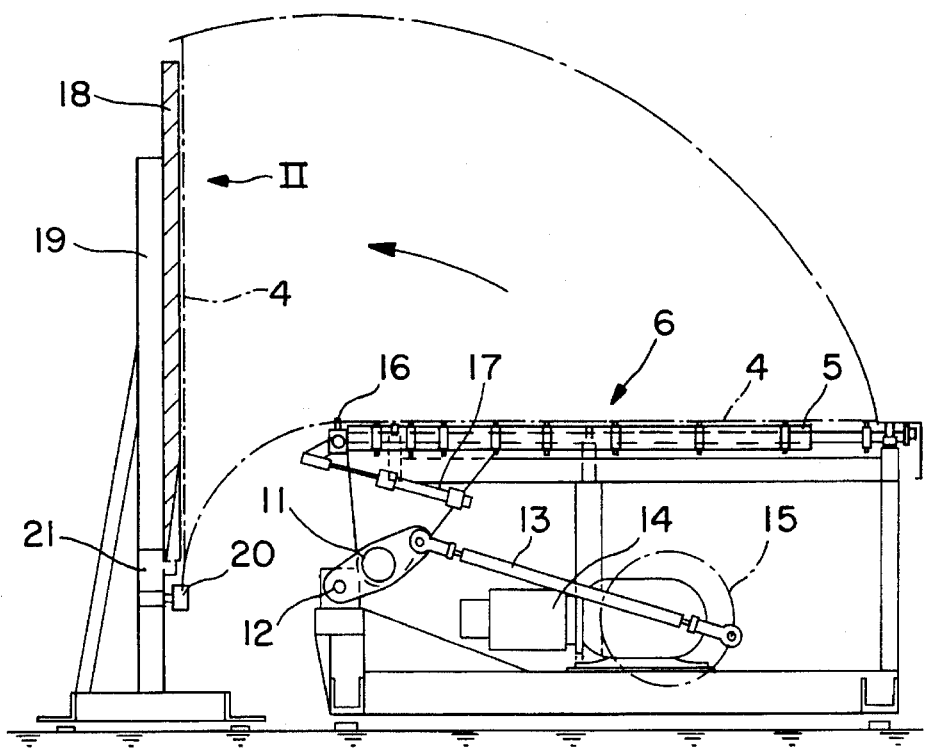

FIGS. 2 to 4 show the putting-up machine 6. FIG. 2 is a view in the direction of II in FIG. 3, FIG. 3 is a schematical section according to the line III—III of FIG. 2, and FIG. 4 is an enlarged detail of FIG. 3. The pivotable grid 5 is connected to a lever 11 pivoting about a swivelling axle 12 and connected to the driving rod 13 of a crank drive 15 driven by a motor 14. The grid comprises a swivelling stop 16 which is normally in the active position shown but which can be swivelled and disengaged by a pneumatic cylinder 17. In fact, the stop is really not a single stop 16 but a row of tooth-like catches which are disposed on a swivelling strip and which are capable of supporting a glass sheet 4 lying on the grid 5 on its entire length when the grid 5 is pivoted upward in the direction of the curved arrow in FIG. 3. The upward pivoting of the glass sheet 4 is effected towards a wall 18 fastened on a stand 19. A row of support rollers 20 on which the glass sheet can be lowered for support is arranged below this wall (FIG. 3). When the glass sheet is pivoted upward, it is supported by the stops or catches 16 until it comes to rest on the supporting rollers 20, and the catches 16 are then made to disengage. An air duct 21 is disposed beneath the support wall 18 and is supplied with air from a blower 22. The air escapes upward from the duct through a number of wedge-like tapered nozzles 23 between the supporting wall 18 and a glass sheet 4 which stands in front of the wall. An air curtain is thus established between the supporting wall 18 and the glass sheet standing in front of it which maintains the glass sheet, largely independently of its size, within a determined distance from the wall 18 and in vertical position. It is indicated in FIG. 2 that all glass sheets, from the smallest ones 4' to the greatest ones 4", can be held in upright position. The supporting wall 18 will be called in the following, together with the blower 22 and the air duct 21, simply "air cushion wall".

The glass sheets run during their transfer from the table 1 to the grid 5 against end stops (not shown) of this grid, so that their leading edge stands in the upright position of the glass sheets according to FIGS. 2 to 4 still in a determined position. It is indicated in FIG. 2 that the leading edges of the glass sheets 4' and 4" have the same position independent on their size. This is an essential condition for the transfer of the glass sheets from the putting-up machine into the sorting carriage 8.

Figure 5:
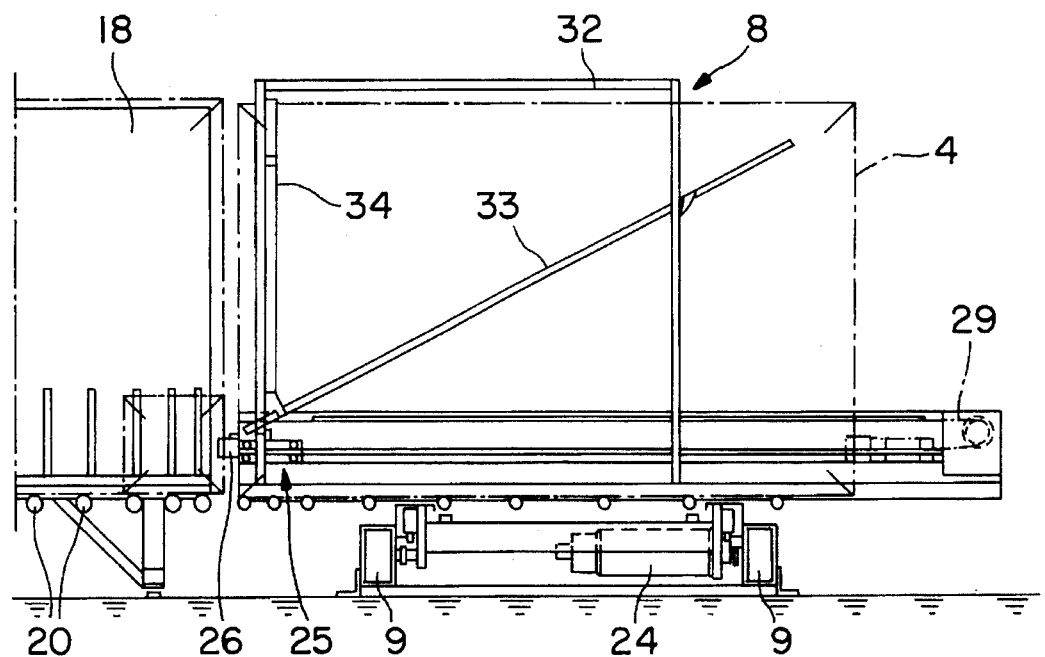
Figure 6:
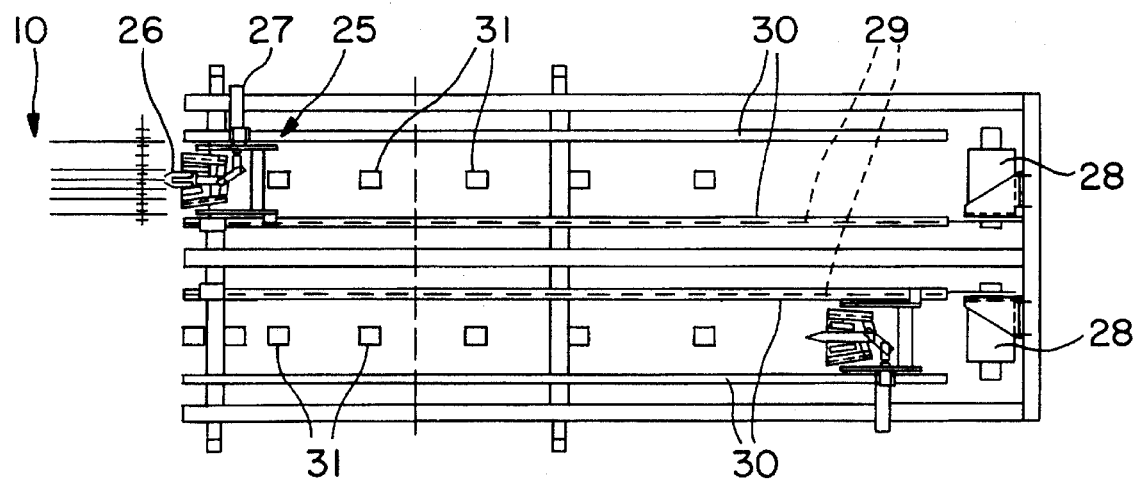

This sorting carriage is represented in FIGS. 5 and 6. As it has already been mentioned, the sorting carriage may run along the guide profiles 9 and can exactly positioned by the motor 24 in order to take over glass sheets from the putting-up machine or insert glass sheets into a compartment of a compartment carriage 10. This taking over or this inserting, respectively, is effected by nippers 25 whose construction is indicated but not further described in FIG. 6. The grippers 26 of the nippers can be opened and closed by a pneumatic cylinder 27, the movement of the nippers being guided according to indicated parallelograms. The gripping surfaces of the nippers are coated by a soft, well adherent material in order to allow the nippers to bring about the forces necessary for pulling and pushing of even the greatest glass sheets. The nippers 25 seize the glass sheets only at the outermost edge to a depth of, e.g., 12 mm where a certain damage of the coating may be accepted since these regions of the glass sheets will undergo a post-treatment anyway. The two pairs of nippers can be displaced by driving motors 28 and chains 29 along guides 30, and this above a series of rollers 31 on each of which the glass sheets will roll during the taking in and ejecting movements. Strips 33 and 34 which are trimmed with nylon brushes are fixed to frames 32 and serve for the lateral support of the glass sheets within the sorting carriage 8. The glass sheets are held between these brushes in upright position and cannot be damaged even if the sorting carriage is relatively strongly accelerated or slowed down during the transfer of the glass sheets into the compartment carriages 10. The positioning movement of the sorting carriage must be effected with high precision, and to achieve this, tooth racks are attached preferably to the guides 9, gearwheels driven by the motor 24 meshing with the racks.

When the sorting carriage 8 has arrived with one of its compartments or its nippers 7, which keep hold of the glass sheet during the displacement of the sorting carriage 8 along the guides 9, in front of the accurate compartment of a compartment carriage 10 and is correcty positioned, the glass sheet is pushed by means of the nippers 7 out of the sorting carriage and inserted by pushing into the corresponding compartment of the compartment carriage. The individual compartments of the compartment carriage 10 may be shaped in a similar manner as the compartments of the sorting carriage 8.

Figure 7:
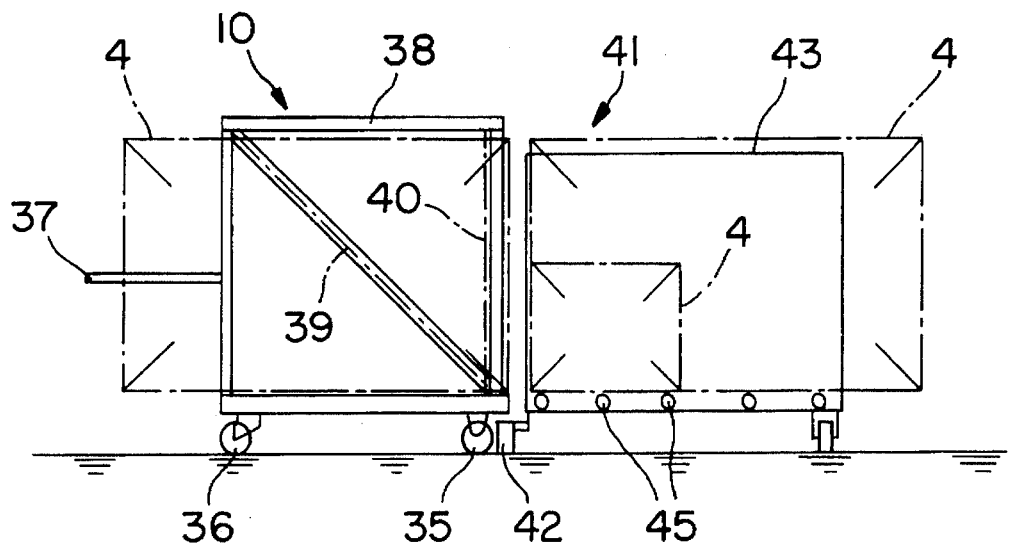
FIGS. 7 and 8 show a station for completing the compartment carriage with special glasses.
Figure 8:
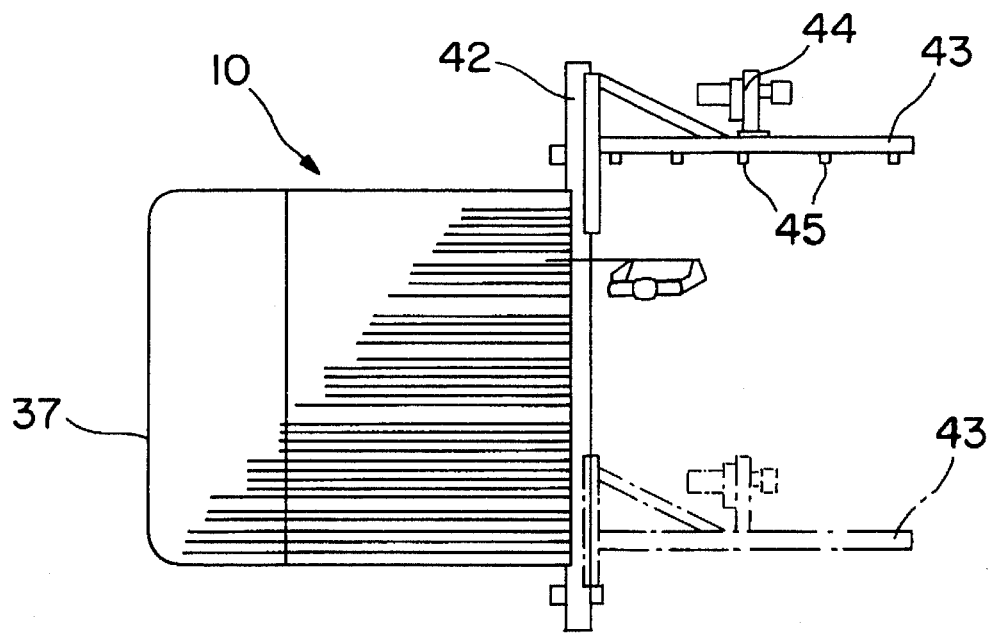

FIGS. 7 and 8 show a somewhat enlarged and more detailed view of the compartment carriage 10. Each carriage comprises stationary rollers 35 and castors 36 so that it may be displaced by hand, for example by means of its handle bar 37. As already mentioned, each compartment carriage 10 comprises, like the sorting carriage 8, vertically erected frames 38 on which wires, ropes or bars are fastened for the lateral supporting of the introduced glass sheets 4; these elements are coated with a soft material such as PVC (polyvinyl chloride). At the introduction side of the compartment carriage, vertical bars 40 are disposed between the compartments; these bars are also provided with a soft coating. On manipulating of the glass sheets during the transfer from the putting-up machine into the sorting carriage and during the transfer from the sorting carriage into a compartment of the compartment carriage 10 as well, the glass sheets are continuously firmly held by the nippers 7 and arrive safely in the correct final position without running the risk that the glass sheets laterally touch solid installation parts or elements and could be damaged.

FIGS. 7 and 8 show schematically a device 41 for the completion of the compartment carriages 10 with special glass sheets. This device comprises a guide 42 to which a compartment carriage 10 can be approached. An air cushion wall 43 of the above depicted kind and having a blower 44, is disposed to be displaced along the stand 42 and to be exactly positioned by hand. Supporting rollers 45 are arranged below the air cushion wall 43, serving for containing glass sheets 4 and holding same in an exactly defined position in the manner already described. As it has been indicated in FIG. 8, smaller special glass sheets can be inserted by hand into the predetermined compartment of the compartment carriage 10. Greater and heavier glass sheets are prepared by means of the travelling air cushion wall, as indicated in FIG. 8. The air cushion wall is then brought into the predetermined, exact position in front of the compartment carriage 10, and the prepared glass sheet 4 is pushed by hand into the corresponding compartment of the compartment carriage. As it has been indicated in several Figures, the glass sheets are always inserted into the compartment carriages and the sorting carriage 8, respectively, only by a distance corresponding to their length.

Figure 9:
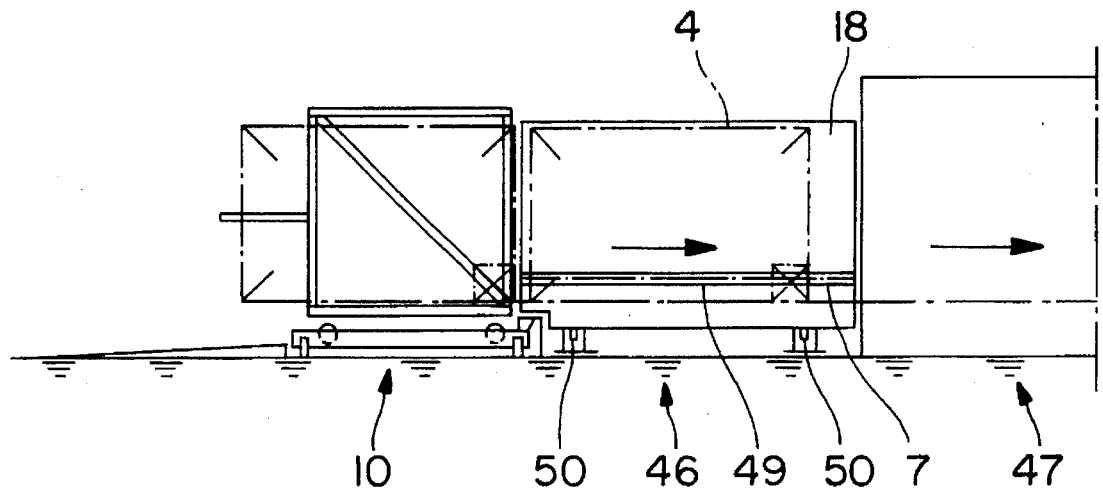
FIGS. 9 and 10 show the transfer of glass plates from a compartment carriage into a subsequent processing installation, and FIG. 11 schematically shows a variant of execution.
Figure 10:
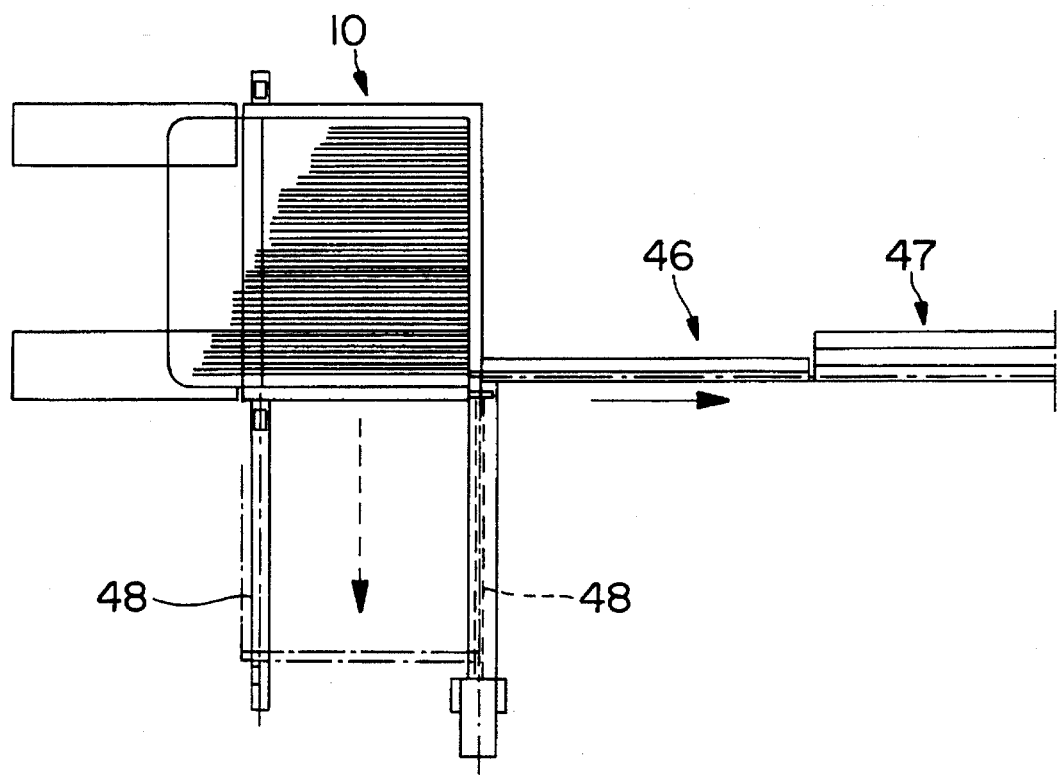

When the compartment carriages are completely occupied, they are brought, according to FIGS. 9 and 10, into an exactly defined position in front of a transfer device 46 for transferring the glass sheets into a further processing installation, for example an insulation glass line 47. To this end, the compartment carriage 10 is displaceable on guides 48 across the stationary transfer device 46 and can be exactly positioned there so that glass sheets can be removed from predetermined compartments in the programmed sequence. This removal is effected by nippers 7 indicated in FIG. 9, which may correspond to the nippers 7 of the sorting carriage but which can be removed across their moving path 49 in order to allow the passage of the glass sheets, taken out of the compartment carriage 10, into the further processing installation 47. The device 46 is also equipped with an air cushion wall 18 in the sense of those of FIGS. 2 to 4, the glass sheets being supported by not shown supporting rollers and being held in front of the air cushion wall in a defined position. The air cushion wall 18 may be swivelled about drag bearings 50 indicated in FIG. 9 in order to tip a glass sheet 4, supported on the air cushion, from the vertical position in which it has been taken out of the compartment carriage 10, into the position required for the taking over by the processing installation 47. This tipping movement may be any desired amount up to 90°, i.e. the glass sheet can be tipped from its vertical position into any other position until the horizontal one.

In order to achieve the exact positioning of the compartment carriages 10 for receiving glass sheets from the sorting carriage 8 (FIG. 1) and for the taking out of glass sheets according to FIGS. 9 and 10 as well, the compartment carriages are preferably lifted on supports thus defining not only their exact position in horizontal direction but also their exact vertical position. The last mentioned condition is important for the trouble-free inserting or removal, respectively, of the glass plates into or out of the compartments of the compartment carriage, without the risk for the glass plates to slide at one corner only on the floor of the compartment carriage.

Figure 11:
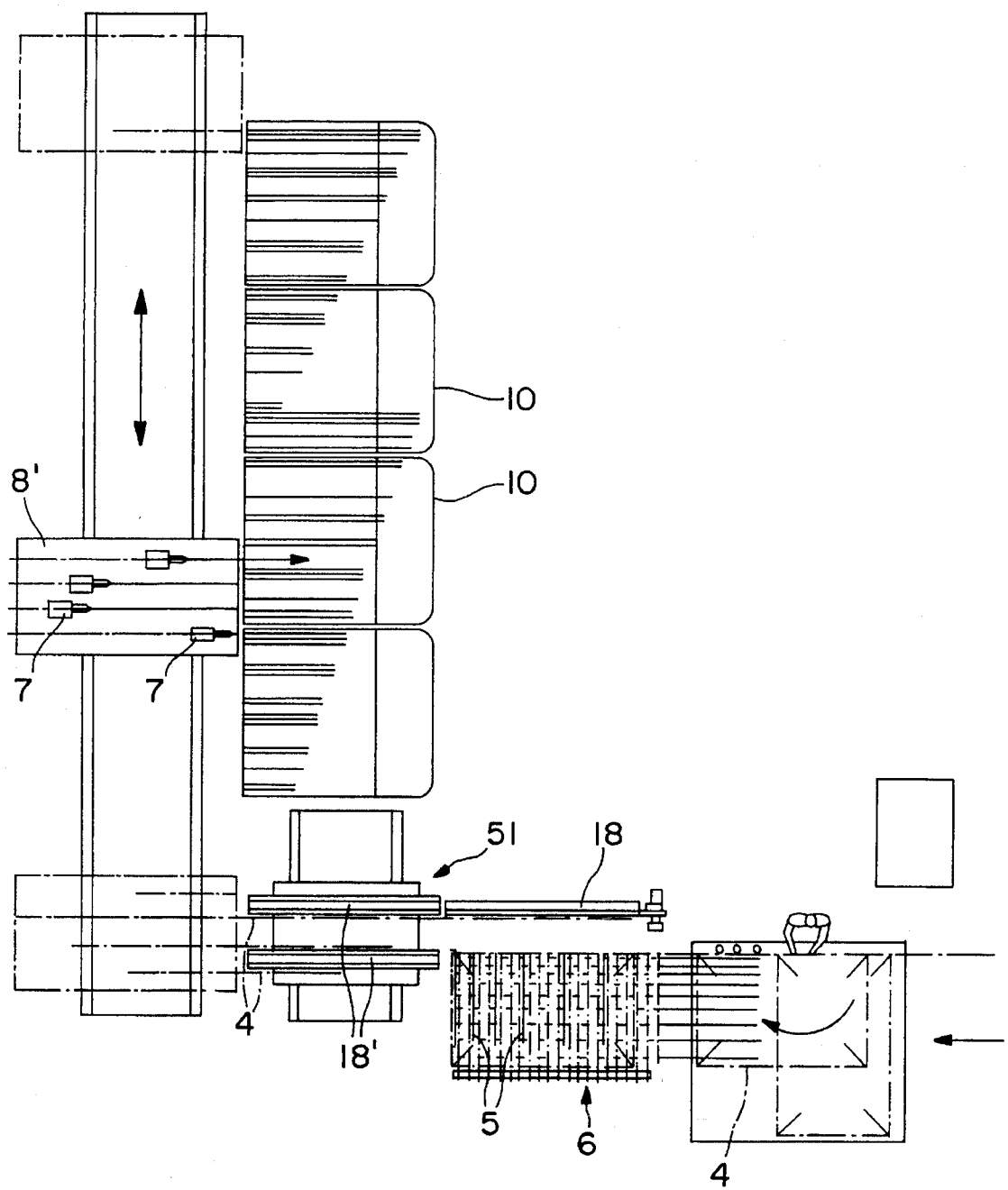

FIG. 11 shows purely schematically a variant of execution wherein corresponding installation elements bear the same reference numerals as in the other Figures. The putting-up machine 6 and the compartment carriages 10 are identically shaped. The difference is that an intermediate storing space or buffer 51 is provided between the putting-up machine 6 and the sorting carriage 8' which comprises four compartments and four pairs of nippers 7. This buffer 51 is also equipped with double sided air cushion walls 18' on which until four glass sheets 4 can be positioned. The sorting carriage 8' can take four glass sheets out of the buffer at a time and transfer them sequentially into the assigned compartments of the compartment carriages 10. This buffer 51 and the increase of the numbers of nippers and compartments of the sorting carriage, respectively, allows to enhance the sorting capacity of the installation according to the invention.

I claim:

1. An installation for use in sorting glass plates, comprising:
   at least one compartment carriage comprising a plurality of compartments, each of said compartments having means for holding upright a single plate independently of a size of the plate; and
   a sorting carriage disposed for movement adjacent to said compartment carriage, said sorting carriage comprising at least one conveyor device having means for stepwise loading and unloading said plates into and out of said compartments of said compartment carriage.

2. The installation of claim 1, wherein said sorting carriage comprises a single said conveyor device, and said conveyor device comprises at least one pair of displaceable nippers for seizing an edge of one of said plates.

3. The installation of claim 1, wherein said sorting carriage comprises two or more said conveyor devices, and each of said conveyor devices separately comprises a set of at least one pair of displaceable nippers for seizing an edge of one of said plates.

4. The installation of claim 1, further comprising a putting-up device, said putting-up device having means for moving each of said plates from a laying position into an upright position before said plates are loaded onto said sorting carriage.

5. The installation of claim 4, said putting-up device comprises a wall and means for producing an air flow between said wall and a plate being moved in an upright position for holding the upright plate spaced from said wall.

6. The installation of claim 1, further comprising a manual completion carriage for loading additional plates into said compartments of said compartment carriage, said completion carriage comprising a wall and means for producing an air flow between said wall and an upright plate for holding the upright plate spaced from said wall, and means for manually pushing the upright plate from said manual completion carriage into a corresponding compartment of said compartment carriage.

7. The installation of claim 1, further comprising a transfer device for transferring said plates from said compartments of said compartment carriage to another installation for further processing, said transfer device having means for moving a plate from an upright position into a non-upright position required for said further processing.

8. The installation of claim 7, wherein said transfer device comprises a wall and means for producing an air flow between said wall and a plate being moved in said upright position, and further comprising a set of at least one pair of displaceable nippers for seizing an edge of said plate.

9. The installation of claim 8, wherein said set of at least one pair of displaceable nippers is disengageable out of a working position.

10. The installation of claim 1, further comprising lateral support members disposed in at least one of said sorting carriage and said compartment carriage, for laterally supporting said plates.

11. The installation of claim 10, wherein said lateral support members comprise brush strips.

12. The installation of claim 10, wherein said lateral support members comprise wires.

13. The installation of claim 10, wherein said lateral support members comprise ropes.

14. The installation of claim 10, wherein said lateral support members comprise bars coated with a soft material.

15. The installation of claim 14, wherein said soft material is PVC.

16. The installation of claim 10, wherein said lateral support members comprise bars having a loose, rotatable shell.

17. The installation of claim 10, wherein said lateral support members are disposed in both said sorting carriage and said compartment carriage.

18. The installation of claim 1, further comprising a plate buffer means for providing intermediate storage of said plates immediately before said plates are loaded onto said sorting carriage.

19. The installation of claim 18, wherein said plate buffer means comprises a pair of double-sided air cushion walls, and means for producing an air flow between each side of said double-sided walls and a respective upright plate, whereby four upright plates can be temporarily stored by said plate buffer means.

20. An installation for use in sorting glass plates, comprising: a putting-up means for moving plates from a horizontal position into a vertical position, said putting-up means having a stand for holding the plates in a vertical position, said stand comprising a first wall and a means for producing an air flow between said first wall and the plates for cushioning the plates while maintaining the plates in said vertical position;

- a movable sorting carriage having a first plurality of sorting compartments, each sorting compartment having a first lateral supporting means for receiving a single plate from said putting-up means while maintaining said plates in a vertical position, and each of said sorting compartments comprising a conveyor means within said sorting compartment for loading and unloading plates from said sorting carriage;
- at least one compartment carriage comprising a second plurality of compartments, each of said second plurality of compartments having lateral supporting means for holding a single plate in a vertical position; and
- means for moving said sorting carriage between a loading position for transferring plates from said putting-up means to said first plurality of sorting compartments and unloading positions for transferring plates from said first plurality of sorting compartments into assigned compartments of said second plurality of compartments.

21. The installation of claim 20, further comprising a plate buffer means for providing intermediate storage of said plates between said putting-up means and said sorting carriage, said plate buffer means comprising a pair of double-sided air cushion walls and means for producing an air flow between each side of said double-sided walls and a respective plate, and wherein said sorting carriage comprises four sorting compartments with respective conveying means, whereby four plates can be temporarily stored on said plate buffer means in a vertical position and then transferred to said sorting carriage.

* * * * *